(12) United States Patent
Amend et al.

(10) Patent No.: US 11,469,990 B2
(45) Date of Patent: Oct. 11, 2022

(54) TECHNIQUES FOR INTERACTION BETWEEN NETWORK PROTOCOLS

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 14 days.

(21) Appl. No.: 16/975,737

(22) PCT Filed: Feb. 21, 2019

(86) PCT No.: PCT/EP2019/054261
§ 371 (c)(1),
(2) Date: Aug. 26, 2020

(87) PCT Pub. No.: WO2019/166307
PCT Pub. Date: Sep. 6, 2019

(65) Prior Publication Data
US 2020/0412641 A1 Dec. 31, 2020

(30) Foreign Application Priority Data
Feb. 28, 2018 (EP) .................................. 18159122

(51) Int. Cl.
*H04L 12/28* (2006.01)
*H04L 45/24* (2022.01)
*H04L 45/52* (2022.01)

(52) U.S. Cl.
CPC ............. *H04L 45/24* (2013.01); *H04L 45/52* (2013.01)

(58) Field of Classification Search
CPC ......... H04L 45/00; H04L 45/02; H04L 45/04; H04L 45/42; H04L 45/123; H04L 45/24; H04L 45/52
See application file for complete search history.

(56) References Cited

U.S. PATENT DOCUMENTS 9,660,877 B1 5/2017 Kanekar et al.
2004/0054798 A1* 3/2004 Frank .................. H04W 12/062
709/229

(Continued)

*Primary Examiner* — Atique Ahmed
(74) *Attorney, Agent, or Firm* — Leydig, Voit & Mayer, Ltd.

(57) ABSTRACT

A multipath device for processing multipath data traffic, the multipath device comprising: a multipath network access interface for receiving multipath data traffic; and a host processor configured to process a plurality of multi-connectivity network protocols. A specific multi-connectivity network protocol of the plurality of multi-connectivity network protocols is configured to utilize protocol-specific resources of the multipath device for processing a portion of the multipath data traffic that is related to the specific multi-connectivity network protocol. The specific multi-connectivity network protocol is configured to share the network protocol-specific resources with other multi-connectivity network protocols which are configured to process portions of the multipath data traffic that are related to the other multi-connectivity network protocols by distributing payload data transport onto multiple sub-flows of a multipath connection.

16 Claims, 5 Drawing Sheets

(56) References Cited

U.S. PATENT DOCUMENTS

| | | | |
|---|---|---|---|
| 2012/0093150 A1* | 4/2012 | Kini | H04L 69/14 |
| | | | 370/389 |
| 2013/0091312 A1* | 4/2013 | Ken | G11C 5/06 |
| | | | 710/106 |
| 2013/0195004 A1* | 8/2013 | Hampel | H04L 69/08 |
| | | | 370/315 |
| 2013/0336334 A1* | 12/2013 | Gilbert | G06F 13/4265 |
| | | | 370/458 |
| 2014/0036702 A1* | 2/2014 | Van Wyk | H04L 43/0823 |
| | | | 370/252 |
| 2015/0237525 A1* | 8/2015 | Mildh | H04L 45/24 |
| | | | 370/230.1 |
| 2015/0381455 A1* | 12/2015 | Martinsen | H04L 45/22 |
| | | | 370/252 |
| 2016/0352653 A1 | 12/2016 | Ong et al. | |
| 2017/0156048 A1* | 6/2017 | Zeng | H04W 8/02 |
| 2017/0188407 A1* | 6/2017 | Zee | H04L 69/14 |
| 2018/0184474 A1* | 6/2018 | Skog | H04W 76/15 |
| 2018/0255175 A1* | 9/2018 | Tran | H04L 65/80 |

* cited by examiner

Fig. 5 ns of the present invention. The features and advantages of various embodiments of the present invention will become apparent by reading the following detailed description with reference to the attached drawings which illustrate the following:

TECHNIQUES FOR INTERACTION BETWEEN NETWORK PROTOCOLS

CROSS-REFERENCE TO PRIOR APPLICATIONS

This application is a U.S. National Phase Application under 35 U.S.C. § 371 of International Application No. PCT/EP2019/054261, filed on Feb. 21, 2019, and claims benefit to European Patent Application No. EP 18159122.3, filed on Feb. 28, 2018. The International Application was published in English on Sep. 6, 2019 as WO 2019/166307 A1 under PCT Article 21(2).

TECHNICAL FIELD

The disclosure relates to techniques for interaction between network protocols for optimized traffic distribution and path exploitation. The disclosure further relates to a multipath device and a method for processing multipath data traffic. In particular, the disclosure relates to interaction between multiple multi-connectivity network protocols for optimized traffic distribution and optimized path exploitation.

BACKGROUND

Figure 1:
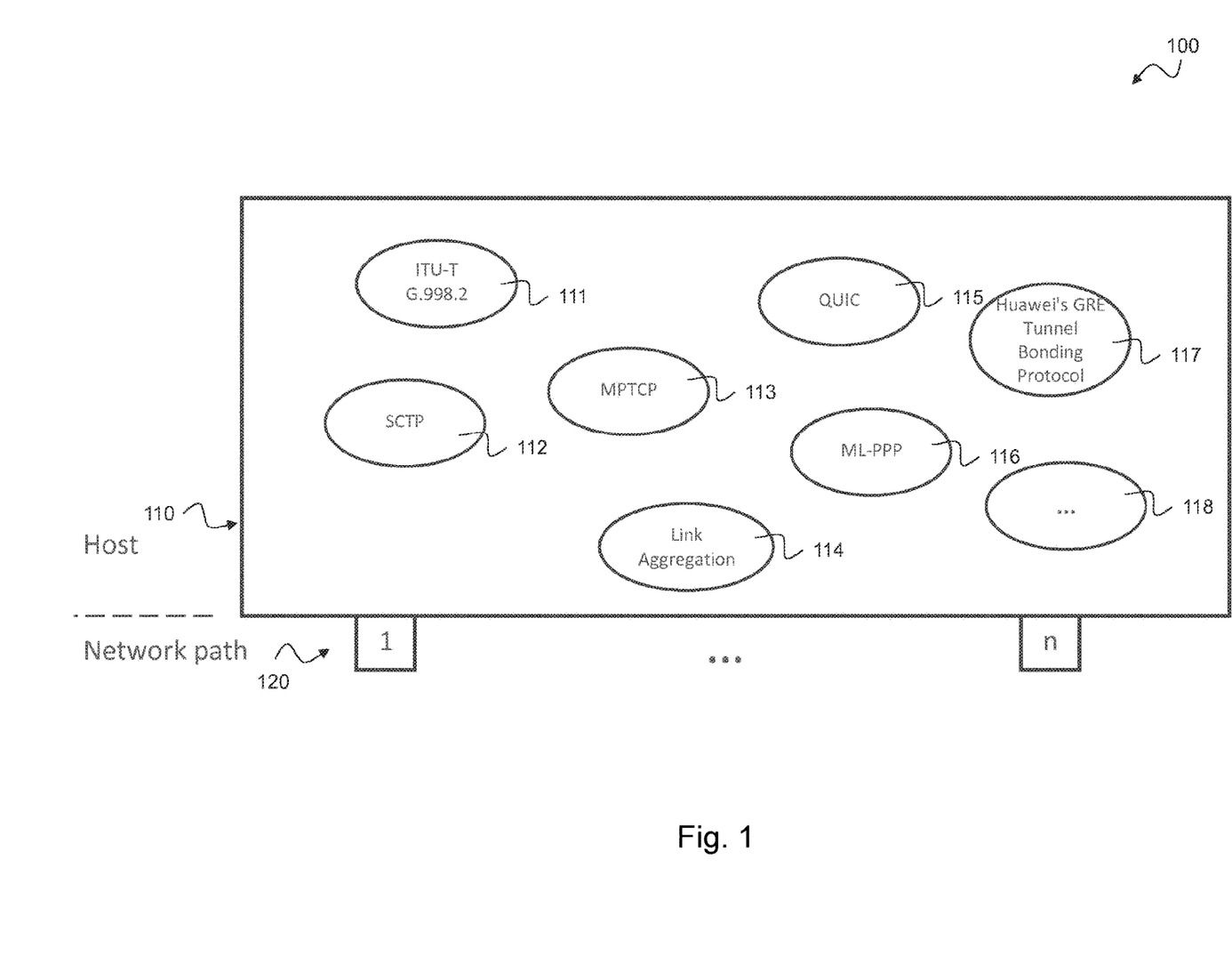
FIG. 1 shows a multi-homed capable endpoint with several exemplary multi path enabled protocols.

With increasing number of device, equipped with multiple network access interfaces, the development of new multi connectivity network protocols becomes more and more important. Mainly it is driven by the wish for better resource utilization from an economic perspective by increasing customer/user Quality of Experience (QoE) or both. Several use cases (e.g. load balancing, seamless handover in case of path interruption, capacity aggregation, etc.) are covered, which can be combined in any way. Especially current developments or extensions like Stream Control Transmission Protocol (SCTP) or Concurrent Multipath Transfer SCTP (CMT-SCTP), Multipath Transmission Control Protocol (MPTCP) and Quick User Datagram Protocol (UDP) Internet Connections (QUIC), which all comprise multi-connectivity features, lead to the assumption that they will find the way to the mass market. Future communication termination points will therefore be equipped with several multi-connectivity network protocols as illustrated in FIG. 1.

SUMMARY

In an exemplary embodiment, the present invention provides a multipath device for processing multipath data traffic. The multipath device includes: a multipath network access interface for receiving multipath data traffic; and a host processor configured to process a plurality of multi-connectivity network protocols. A specific multi-connectivity network protocol of the plurality of multi-connectivity network protocols is configured to utilize protocol-specific resources of the multipath device for processing a portion of the multipath data traffic that is related to the specific multi-connectivity network protocol. The specific multi-connectivity network protocol is configured to share the network protocol-specific resources with other multi-connectivity network protocols which are configured to process portions of the multipath data traffic that are related to the other multi-connectivity network protocols by distributing payload data transport onto multiple sub-flows of a multipath connection.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION OF EMBODIMENTS

Exemplary embodiments of the present invention efficiently utilize network protocols, in particular multi-connectivity network protocols, coexisting in the same communication device.

Exemplary embodiments of this disclosure use an information exchange between the different multi-connectivity network protocols and even non-multi connectivity protocols, independent of on which Open Systems Interconnection (OSI) layer they act, to optimize concurrent usage of resources and hence to avoid interference and efficiency loss.

A protocol may, for example, exchange the information about current or planned capacity demand and/or current latency/capacity estimation or type of service or prioritization or planned/active scheduling. Other protocols which pick these information can adapt their behavior and return own information.

Another approach is to maintain an overarching congestion control feed by the information of different protocols. The congestion control information of the individual protocols can be combined or derived from other information of the individual protocols.

A further approach is to maintain a joint path management. Protocols are informed about a new potential or removed path, monitor network interfaces and share route information. The path management can exploit individual path management techniques of the individual multi-connectivity network protocols.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In the following, network protocols, also denoted as communication protocols are described. A network protocol is a system of rules that allow two or more entities of a communications system to transmit information via a communication channel or transmission medium. The network protocol defines the rules "Syntax", "Semantic" and "Synchronization" of communication and possible error detection and correction. Network protocols may be implemented by computer hardware, software, or a combination of both. Communicating systems use well-defined formats for exchanging various messages. Each message has an exact meaning intended to elicit a response from a range of possible responses pre-determined for that particular situation. The specified behavior is typically independent of how it is to be implemented. Communication protocols have to be agreed upon by the parties involved. To reach agreement, a network protocol may be developed into a technical standard. Multiple protocols often describe different aspects of a single communication. A group of (network) protocols designed to work together are known as a (network) protocol suite; when implemented in software they are a (network) protocol stack. Internet communication protocols are published by the Internet Engineering Task Force (IETF). The Institute of Electrical and Electronics Engineers (IEEE) handles wired and wireless networking, and the International Organization for Standardization (ISO) handles other types. Network protocols can run as software on a processor or may be implemented as hardware circuits.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect the invention relates to a multipath device for processing multipath data traffic, the multipath device comprising: a multipath network access interface for receiving multipath data traffic; and a host processor configured to process a plurality of network protocols, wherein a specific network protocol of the plurality of network protocols is configured to utilize protocol-specific resources of the multipath device for processing a portion of the multipath data traffic that is related to the specific network protocol, and wherein the specific network protocol is configured to share the network protocol-specific resources with other network protocols which are configured to process portions of the multipath data traffic that are related to the other network protocols.

Such a multipath device provides efficient utilization of the network protocols, since the network protocol-specific resources of the multipath device are shared between the network protocols and hence resources are efficiently used. The network protocols may be multi-connectivity network protocols and/or non-multi connectivity network protocols. Hence, an information exchange between the different network protocols can be realized, independent of on which OSI layer they act, to optimize concurrent usage of resources and thereby avoid interference and efficiency loss. For example, a network protocol can exchange the information about current or planned capacity demand and/or current latency/capacity estimation or type of service or prioritization or planned/active scheduling. Other network protocols which pick these information can adapt their behavior and return their own information.

The network protocols may run as software on the host processor or may be implemented as hardware circuits forming part of the host processor.

In an exemplary implementation form of the multipath device, the host processor is configured to exchange information between network protocols of the plurality of network protocols for scheduling concurrent usage of the network-protocol-specific resources.

When information is exchanged between the network protocols, the decision for scheduling concurrent usage of the resources has higher reliability.

In an exemplary implementation form of the multipath device, the exchanged information comprises at least one of the following: current or planned capacity demand, current latency and/or capacity estimation, type of service, prioritization, planned and/or active scheduling.

This provides the advantage that concurrent usage of resources for different network protocols can be better detected and a more efficient mechanism for sharing these resources can be implemented.

In an exemplary implementation form of the multipath device, the specific network protocol is configured to process the portion of the multipath data traffic that is related to the specific network protocol based on information received from the other network protocols.

This provides the advantage that the specific network protocol can apply network resources depending on the needs and requirements of the other network protocols. Sharing of network resources can be efficiently implemented when each network protocol knows about the requirements of the other network protocols.

In an exemplary implementation form of the multipath device, the host processor is configured to process a common congestion control for at least two network protocols of the plurality of network protocols based on information exchanged between the at least two network protocols.

This provides the advantage that the common congestion control has more information available than individual congestion controls per network protocol. The congestion control information of the individual protocols can be combined or can be derived from other information of the individual protocols. This allows for improving precision of congestion control.

In an exemplary implementation form of the multipath device, the host processor is configured to maintain a joint path management for at least two network protocols of the plurality of network protocols based on information exchanged between the at least two network protocols.

This provides the advantage that a joint path management can obtain information from more sources than individual path managements and thus provide a more accurate path management. Protocols may be informed about a new potential or removed path, may monitor network interfaces and share route information. The path management can exploit individual path management techniques of the individual multi-connectivity network protocols.

Path management is used for managing multipath transport within the network. Each multipath connection consists of one or more sub-flows. Each sub-flow is defined by a source/destination address (e.g. IPv4 or IPv6) pair. By using multipath network protocols network resources can be shared by distributing payload data transport onto multiple sub-flows. Then, multiple paths in the underlying network can be utilized to maximize the overall connection throughput. Path management is responsible for this sharing/distribution. A path manager that has access to more information can better perform sharing of resources and distribution of payload data transport.

In an exemplary implementation form of the multipath device, the host processor is configured to link a selected number of network protocols of the plurality of network protocols to each other in order to send, receive and/or request information from each other, in particular by two-way communication or by one-way communication.

This provides the advantage that network protocols can be divided into groups, for example groups based on specific targets, requirements, priority, etc. These groups can be treated in a different way than other network protocols not belonging to that group. For example multi-connectivity network protocols form one group and non-multi connectivity network protocols can form another group. This allows a more efficient utilization of network protocols.

In an exemplary implementation form of the multipath device, the host processor is configured to form a full mesh information exchange or at least a partial mesh information exchange for linking the selected number of network protocols to each other.

This provides the advantage that by using full mesh information exchange each network protocol knows about requirements, states, etc. of the other network protocols. By using a partial mesh a specific distribution of information can be implemented considering dependencies between network protocols.

In an exemplary implementation form of the multipath device, the host processor comprises a Multipath Central Information Exchange (MCIE) unit which is configured to exchange information between at least two network protocols of the plurality of network protocols.

This provides the advantage that the MCIE unit can be implemented as a central unit for distributing all required information. Hence, knowledge can be implemented in the MCIE unit, thereby releasing the network protocols from information exchange management. For the MCIE unit it is easier to exchange information than for each single network protocol as the MCIE unit can centrally manage information. A further advantage is that the MCIE unit can provide standardized interfaces, while the various network protocols may require individual, i.e. network protocol specific interfaces. The computational complexity for implementing standardized interfaces is less than a complexity for implementing various network protocol specific interfaces.

In an exemplary implementation form of the multipath device, the at least two network protocols are configured to register and/or deregister at the MCIE unit for information exchange.

This provides the advantage that information exchange can be flexibly implemented. When a new network protocol is realized or started on the host processor, it can be easily registered at the MCIE unit which can provide the required information. When a network protocol is terminated, it can deregister from the MCIE unit which informs all other network protocols that are in connection with the terminating network protocol. Then the other network protocols can increase their resource quota. An additional advantage of the MCIE is that the MCIE unit may hook into a network protocol to take over processing tasks of the network protocol and/or to receive data from the network protocol, for example in cases in which the network protocol is not able to register or deregister an interface with the MCIE unit. The MCIE unit may at least partly take over control of the network protocol.

In an exemplary implementation form of the multipath device, the at least two network protocols are configured to provide their capabilities and interests to the MCIE unit when registering at the MCIE unit.

This provides the advantage that the network protocols which provide information to the MCIE unit need only one link to share this information, e.g. their capabilities and interests, with all other network protocols instead of multiple links with each network protocol that may be interested in receiving this information. Hence, the MCIE unit reduces the complexity of the whole multipath device.

In an exemplary implementation form of the multipath device, the MCIE unit is configured to limit the information exchange to certain types of network protocols and/or limit the information exchange in time.

This provides the advantage that information can be forwarded in a goal-oriented manner, and only certain types of network protocols that can understand or make use of the information can be provided with that information. Limiting the information exchange in time allows for reserving some time to be available for other tasks than information exchange.

In an exemplary implementation form of the multipath device, the MCIE unit is configured to control the information exchange based on external information input.

This provides the advantage that via the external information input a configuration of the host processor may be adjusted from an external source. Hence the multipath device can specify from an external source which configuration shall be applied. Higher flexibility can be implemented.

In an exemplary implementation form of the multipath device, the host processor is configured to exchange a first portion of information between the at least two network protocols via the MCIE unit and a second portion of information between the at least two network protocols bypassing the MCIE unit.

This provides the advantage that information exchange can be flexibly partitioned into direct information exchange in between the network protocols without using the MCIE unit and indirect information exchange via the MCIE unit.

In an exemplary implementation form of the multipath device, the specific network protocol comprises a multi-connectivity network protocol that is configured to share the network protocol-specific resources with other multi-connectivity network protocols and/or non-multi connectivity network protocols.

This allows for implementing a higher degree of flexibility when resources can be shared between multi-connectivity network protocols and non-multi connectivity network protocols.

In an exemplary implementation form of the multipath device, the specific network protocol is configured to share the network protocol-specific resources with other network protocols operating on different OSI (Open Systems Interconnection) layers than the specific network protocol.

This provides the advantage that path optimization can be performed through whole protocol stacks, e.g. the application layer can receive information from the network layer or transport layer. Application Programming Interfaces (APIs) can access more information providing more insight into the network.

In an exemplary implementation form of the multipath device, the network protocols include one or more of the following: ITU-T G998.2, SCTP, MPTCP, Link Aggregation, QUIC, Multilink Point-to-Point Protocol (ML-PPP), Huawei's GRE Tunnel Bonding Protocol.

This provides the advantage that a lot of currently used network protocols can share information and resources in order to optimize their traffic distribution and path exploitation.

According to a second aspect, the invention relates to a method for processing multipath data traffic, the method comprising: receiving multipath data traffic via a multipath network access interface; processing a plurality of network protocols by a host processor; utilizing, by a specific network protocol of the plurality of network protocols, protocol-specific resources for processing a portion of the multipath data traffic that is related to the specific network protocol; and sharing, by the specific network protocol, the network protocol-specific resources with other network protocols which are configured to process portions of the multipath data traffic that are related to the other network protocols.

Such a method allows for efficient utilization of the network protocols, since the network protocol-specific resources of the multipath device are shared between the network protocols and hence resources are efficiently used. The network protocols may be multi-connectivity network protocols and/or non-multi connectivity network protocols. Hence, an information exchange between the different network protocols can be realized, independent of on which OSI layer they act, to optimize concurrent usage of resources and thereby avoid interference and efficiency loss.

According to a third aspect, the invention relates to a computer readable non-transitory medium on which computer instructions are stored which, when executed by a computer, cause the computer to perform the method according to the second aspect of the invention.

According to a fourth aspect the invention relates to a computer program product comprising program code for performing the method according to the second aspect of the invention, when executed on a computer or a processor.

Embodiments of the invention can be implemented in hardware and/or software.

The following acronyms are applied in this disclosure:
CMT-SCTP Concurrent Multipath Transfer SCTP
GRE Generic Routing Encapsulation
MCIE Multipath Central Information Exchange
MPTCP Multipath TCP
QoE Quality of Experience
OSI Open Systems Interconnection
QUIC Quick UDP Internet Connections
SCTP Stream Control Transmission Protocol
TCP Transmission Control Protocol
UDP User Datagram Protocol In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a multi-homed capable endpoint 100 with several exemplary multi path enabled protocols. The multi-homed capable endpoint or endpoint device 100 is equipped with a multiple network access interface 120 and a host processor 110. On the host processor 110 a multitude of multi-connectivity network protocols can be implemented, such as SCTP network protocol 112 according to "R. Stewart, "Stream Control Transmission Protocol", RFC No. 4960, September 2007", MPTCP network protocol 113 according to "A. Ford and C. Raiciu and M. Handley and O. Bonaventure, "TCP Extensions for Multipath Operation with Multiple Addresses", RFC no. 6824, January 2013", QUIC network protocol according to "Ryan Hamilton and Jana Iyengar and Ian Swett and Alyssa Wilk, "QUIC: A UDP-Based Secure and Reliable Transport for HTTP/2", draft-tsvwg-quic-protocol-02, January 2016", ITU-T G.998.2 network protocol 111, Link Aggregation network protocol 114, ML-PPP network protocol 116, Huawei's GRE Tunnel Bonding Protocol 117 and diverse others, e.g. CMT-SCTP network protocol according to "Paul Amer and Martin Becke and Thomas Dreibholz and Nasif Ekiz and Janardhan Iyengar and Preethi Natarajan and Randall Stewart and Michael Tuexen, "Load Sharing for the Stream Control Transmission Protocol (SCTP)", draft-tuexen-tsvwg-sctp-multipath-15, January 2018".

Figure 2:
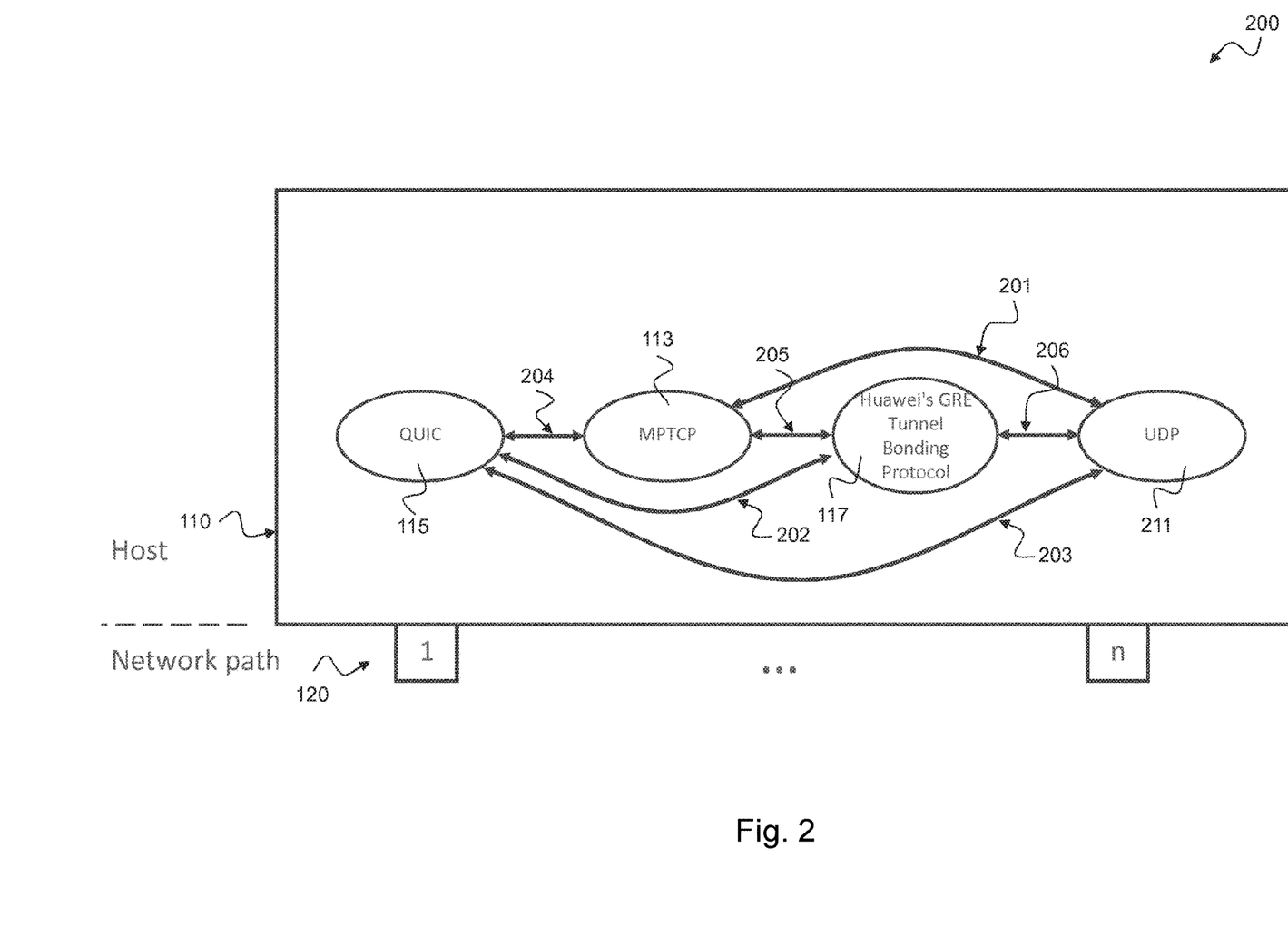
FIG. 2 shows a schematic diagram of a multipath device 200 according to the disclosure using direct exchange of multipath relevant information between several protocols.

FIG. 2 shows a schematic diagram of a multipath device 200 according to the disclosure using direct exchange of multipath relevant information between several protocols. FIG. 2 shows the direct information exchange 201, 202, 203, 204, 205, 206 between several protocols 115, 113, 117, 211. In this example, it is depicted as a full mesh information exchange, where all protocols 115, 113, 117, 211 are linked to each other and can send and get information 201, 202, 203, 204, 205, 206 (two-way communication). However, it is not mandatory to link all of them. It also works with a limited selection and one-way communication. Protocols 115, 113, 117, 211, linked with each other, can send, receive and request information 201, 202, 203, 204, 205, 206.

Figure 3:
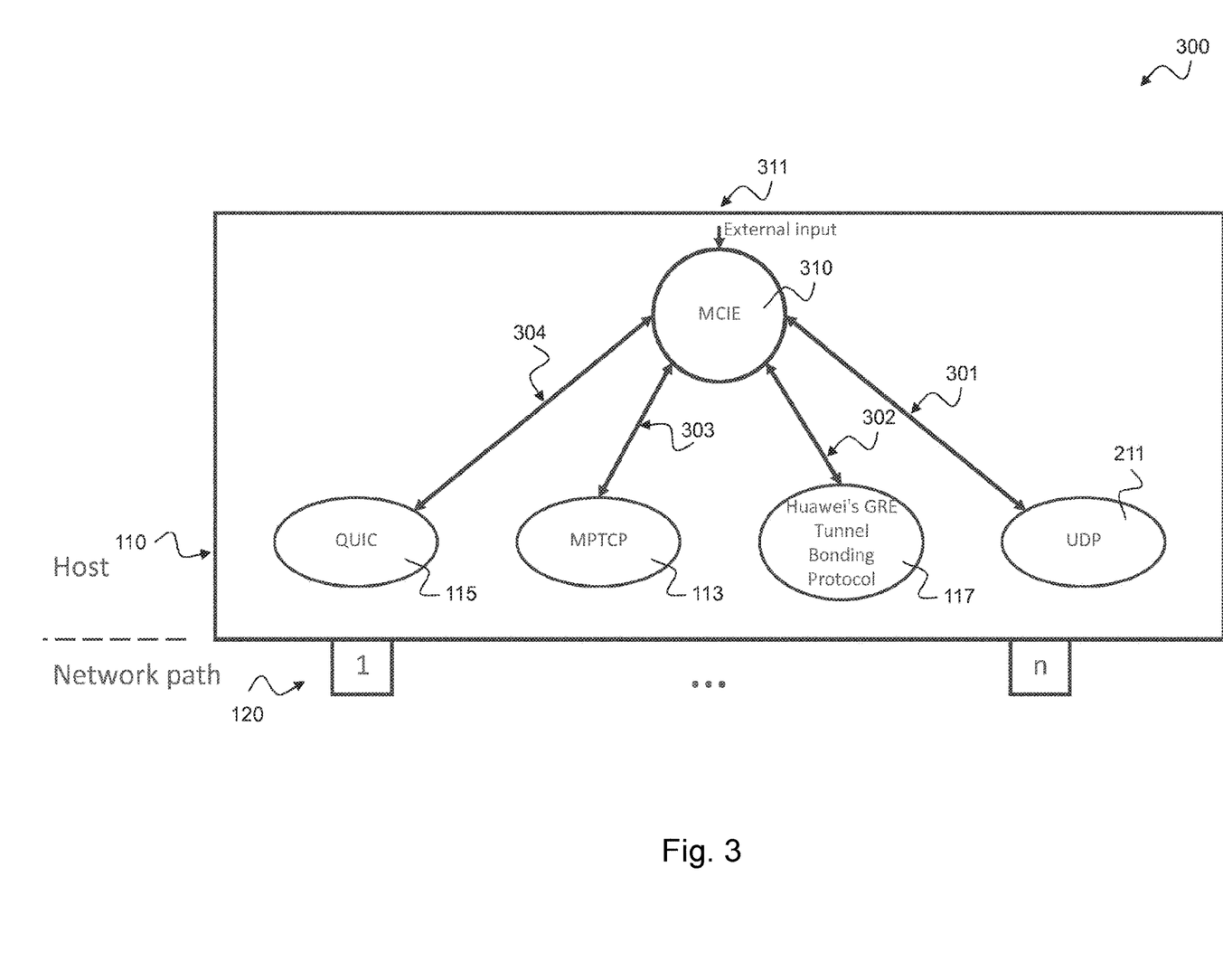
FIG. 3 shows a schematic diagram of a multipath device 300 according to the disclosure using central exchange of multipath relevant information between several protocols.

FIG. 3 shows a schematic diagram of a multipath device 300 according to the disclosure using central exchange of multipath relevant information between several protocols. In FIG. 3 the direct communication 201, 202, 203, 204, 205, 206 as shown in FIG. 2 is replaced by the additional instance MCIE (Multipath Central Information Exchange) 310 which acts as single unit for receiving and scheduling information 301, 302, 303, 304 between the protocols 115, 113, 117, 211. The protocols 115, 113, 117, 211 can register or deregister at MCIE 310 and they can provide their capabilities and interests to MCIE 310. The protocols 115, 113, 117, 211 can send, receive and request information 301, 302, 303, 304. Information 301, 302, 303, 304 can be limited to certain kind of protocols 115, 113, 117, 211 or may be limited in time. The MCIE 310 is able to receive external information input 311.

In an exemplary implementation, the MCIE unit 310 can directly hook into a network protocol, e.g. one or more of the protocols 115, 113, 117, 211 shown in FIG. 3, to take over processing tasks of the network protocol 115, 113, 117, 211 and/or to receive data from the network protocol 115, 113, 117, 211, for example in cases in which the network protocol 115, 113, 117, 211 is not able to register or deregister an interface 301, 302, 303, 304 with the MCIE unit 310. The MCIE unit 310 may then at least partly take over control of the respective network protocol 115, 113, 117, 211.

Figure 4:
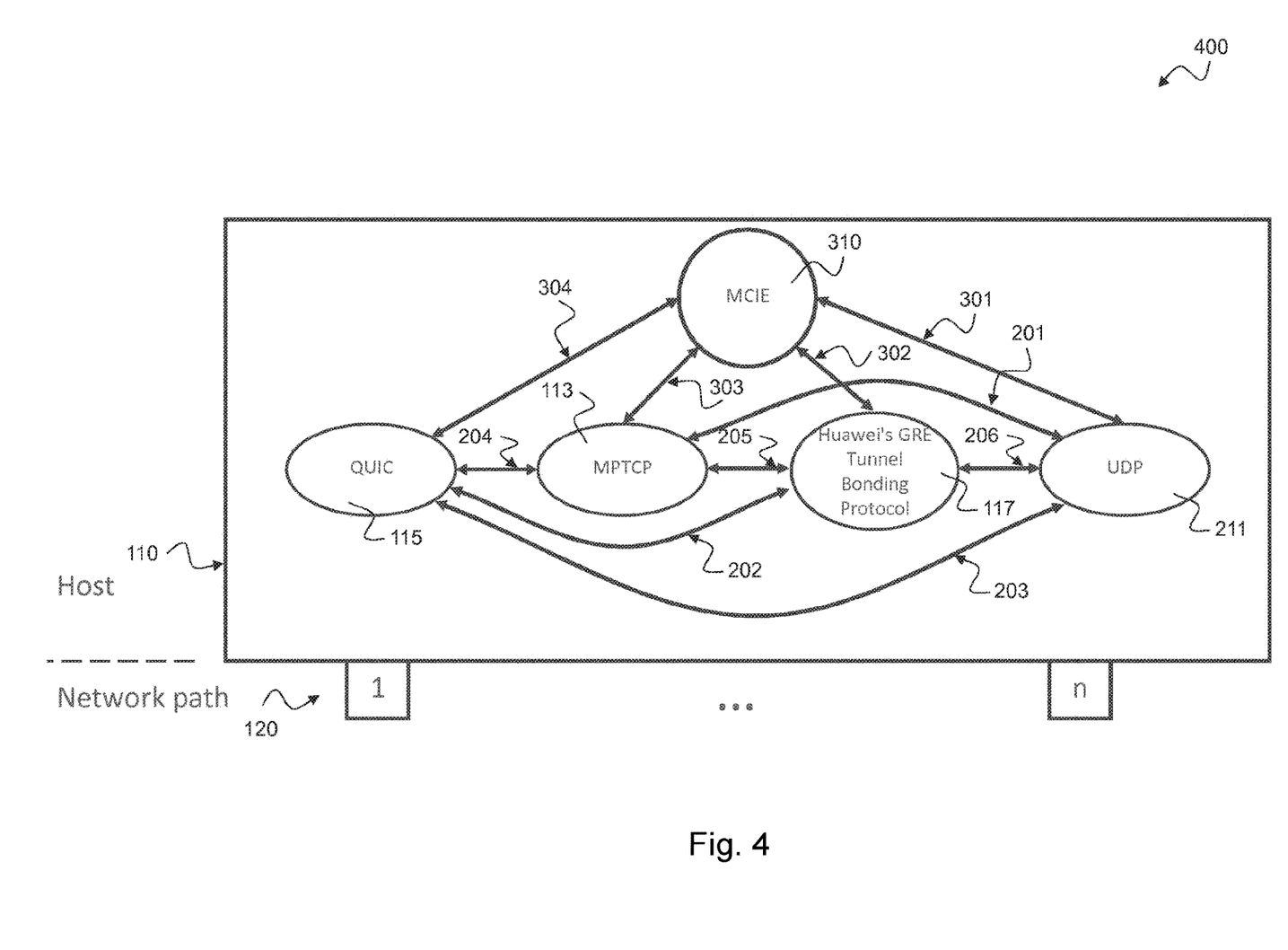
FIG. 4 shows a schematic diagram of a multipath device 400 according to the disclosure using combination of direct and central exchange of multipath relevant information between several protocols.

FIG. 4 shows a schematic diagram of a multipath device 400 according to the disclosure using combination of direct and central exchange of multipath relevant information between several protocols. FIG. 4 is a combination of the central exchange 300 as described above with respect to FIG. 3 and the direct exchange 200 as described above with respect to FIG. 2, which may be relevant, if there is information which shall be shared amongst different protocols 115, 113, 117, 211 or exclusively transmitted between certain protocols 115, 113, 117, 211.

The multipath device 200, 300, 400 as illustrated in FIGS. 2 to 4 can be used for processing multipath data traffic. Such multipath device 200, 300, 400 includes a multipath network access interface 120 for receiving multipath data traffic; and a host processor 110 configured to process a plurality of network protocols, e.g. network protocols 115, 113, 117, 211 as shown in FIGS. 2 to 4. A specific network protocol, e.g. network protocol 113, of the plurality of network protocols 115, 113, 117, 211 is configured to utilize protocol-specific resources of the multipath device 200, 300, 400 (or channel resources) for processing a portion of the multipath data traffic that is related to the specific network protocol 113. The specific network protocol 113 is configured to share the network protocol-specific resources with other network protocols, e.g. network protocols 115, 117, 211, which are configured to process portions of the multipath data traffic that are related to the other network protocols 115, 117, 211.

The specific network protocol 113 may comprise a multi-connectivity network protocol that is configured to share the network protocol-specific resources with other multi-connectivity network protocols and/or non-multi connectivity network protocols. The specific network protocol 113 may be configured to share the network protocol-specific resources with other network protocols operating on different OSI (Open Systems Interconnection) layers than the specific network protocol, e.g. between OSI layer 3 and OSI layer 4. The network protocols may include one or more of the following: ITU-T G998.2, SCTP, MPTCP, Link Aggregation, QUIC, ML-PPP, Huawei's GRE Tunnel Bonding Protocol, e.g. as shown in FIG. 1.

The host processor 110 may be configured to exchange information 201, 202, 203, 204, 205, 206 between network protocols of the plurality of network protocols 115, 113, 117, 211 for scheduling concurrent usage of the network-protocol-specific resources, e.g. as shown in FIG. 2. Of course information 301, 302, 303, 304 may also be exchanged via a central unit, e.g. the MCIE unit 310 as shown in FIG. 3.

The exchanged information 201, 202, 203, 204, 205, 206 may include one or more of the following: current or planned capacity demand, current latency and/or capacity estimation, type of service, prioritization, planned and/or active scheduling.

The specific network protocol 113 may be configured to process the portion of the multipath data traffic that is related to the specific network protocol 113, based on information 201, 204, 205 received from the other network protocols 115, 117, 211.

The host processor 110 may be configured to process a common congestion control for at least two network protocols of the plurality of network protocols 115, 113, 117, 211 based on information exchanged between the at least two network protocols.

Congestion control modulates traffic entry into a telecommunications network in order to avoid congestive collapse resulting from oversubscription. This is typically accomplished by reducing the rate of packets and it should not be confused with flow control, which prevents the sender from overwhelming the receiver. Congestion control includes techniques such as exponential back-off, fair queuing, priority schemes, etc.

The host processor 110 may be configured to maintain a joint path management for at least two network protocols of the plurality of network protocols 115, 113, 117, 211 based on information exchanged between the at least two network protocols.

The host processor 110 may be configured to link a selected number of network protocols of the plurality of network protocols 115, 113, 117, 211 to each other in order to send, receive and/or request information from each other, in particular by two-way communication or by one-way communication.

The host processor 110 may be configured to form a full mesh information exchange 201, 202, 203, 204, 205, 206, e.g. as shown in FIG. 2 or at least a partial mesh information exchange for linking the selected number of network protocols to each other.

The host processor 110 may include a Multipath Central Information Exchange (MCIE) unit 310 as shown in FIGS. 3 and 4 which is configured to exchange information 301, 302, 303, 304 between at least two network protocols of the plurality of network protocols 115, 113, 117, 211.

The at least two network protocols may be configured to register and/or deregister at the MCIE unit 310 for information exchange 301, 302, 303, 304. The at least two network protocols may be configured to provide their capabilities and interests to the MCIE unit 310 when registering at the MCIE unit 310.

The MCIE unit 310 may hook into a network protocol, e.g. one or more of the protocols 115, 113, 117, 211 shown in FIG. 4, to take over processing tasks of the network protocol 115, 113, 117, 211 and/or to receive data from the network protocol 115, 113, 117, 211, for example in cases in which the network protocol 115, 113, 117, 211 is not able to register or deregister an interface 301, 302, 303, 304 with the MCIE unit 310. The MCIE unit 310 may then at least partly take over control of the respective network protocol 115, 113, 117, 211.

The MCIE unit 310 may be configured to limit the information exchange 301, 302, 303, 304 to certain types of network protocols and/or limit the information exchange 301, 302, 303, 304 in time. For example information exchange may be limited to specific time slots. For example, some network protocols may be forbidden to exchange information, e.g. high-priority network protocols with low-priority network protocols, network protocols on different OSI layers, etc.

The MCIE unit 310 may be configured to control the information exchange 301, 302, 303, 304 based on external information input 311. For example the external information input may provide a configuration to the host processor. In this configuration specific limitation of information exchange, network protocols, interfaces and network paths may be specified.

In the example of FIG. 4, the host processor 110 may be configured to exchange a first portion of information, e.g. information 301, 302, 303, 304 between the at least two network protocols via the MCIE unit 310 and a second portion of information, e.g. information 201, 202, 203, 204, 205, 206 directly between the at least two network protocols without using the MCIE unit 310, e.g. by bypassing the MCIE unit 310.

Figure 5:
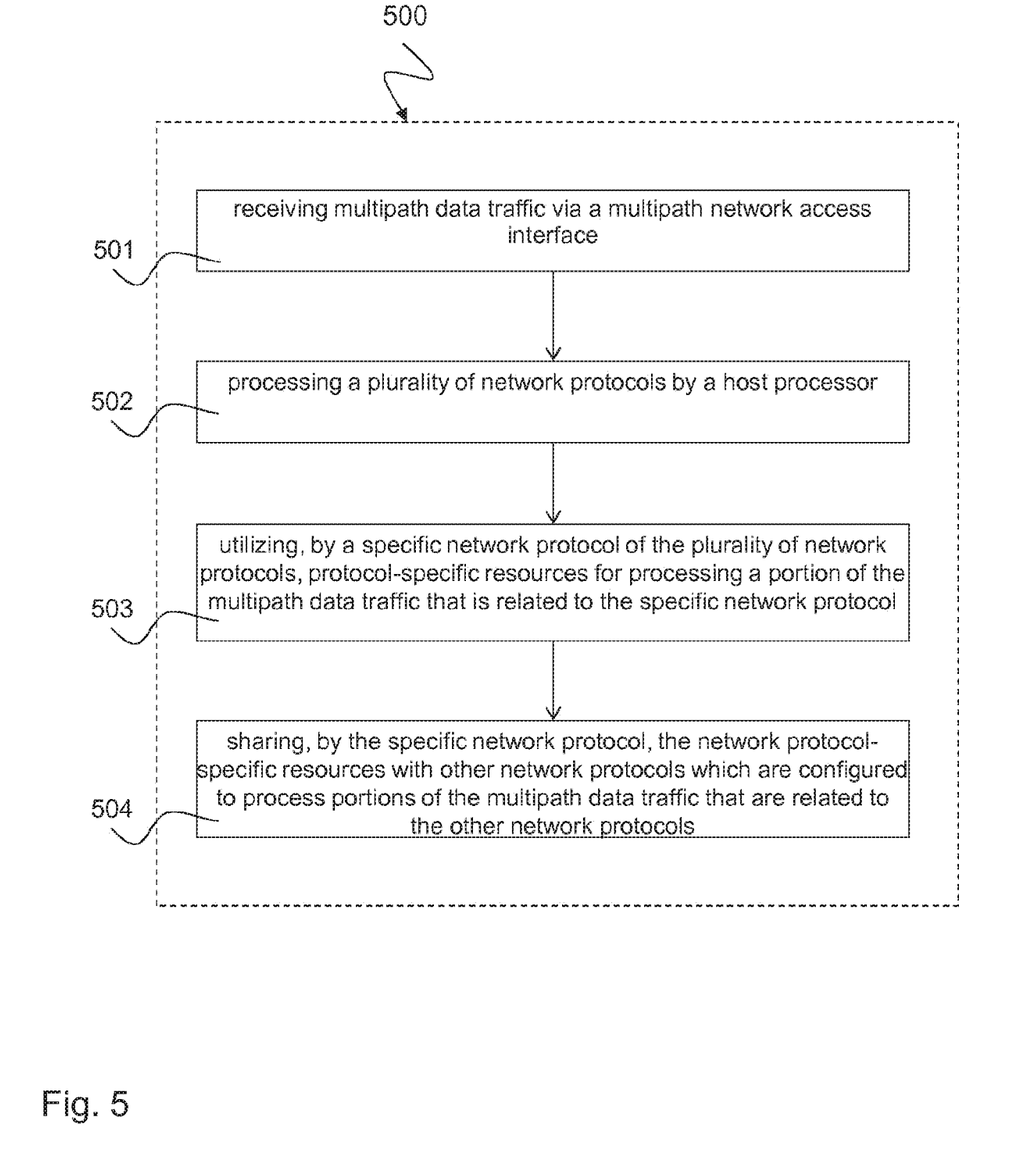
FIG. 5 shows a schematic diagram illustrating a method 500 for processing multipath data traffic according to the disclosure.

FIG. 5 shows a schematic diagram illustrating a method 500 for processing multipath data traffic according to the disclosure.

The method 500 includes receiving 501 multipath data traffic via a multipath network access interface 120, e.g. as described above with respect to FIGS. 2 to 4.

The method 500 includes processing 502 a plurality of network protocols 115, 113, 117, 211 by a host processor 110, e.g. as described above with respect to FIGS. 2 to 4.

The method 500 includes utilizing 503, by a specific network protocol 113 of the plurality of network protocols 115, 113, 117, 211, protocol-specific resources for processing a portion of the multipath data traffic that is related to the specific network protocol 113, e.g. as described above with respect to FIGS. 2 to 4.

The method 500 includes sharing 504, by the specific network protocol 113, the network protocol-specific resources with other network protocols 115, 117, 211 which are configured to process portions of the multipath data traffic that are related to the other network protocols 115, 117, 211, e.g. as described above with respect to FIGS. 2 to 4.

The method 500 may be implemented on a multipath device 200, 300, 400 as described above with respect to FIGS. 2 to 4, in particular on a host processor 110 as described above with respect to FIGS. 2 to 4.

The method 500 may include further steps, such as, for example, according to the computing blocks described above with reference to FIGS. 2 to 4, in particular as described above with respect to the multipath device 200, 300, 400 of FIGS. 2 to 4.

The method 500 may be implemented on a computer. Another aspect of the invention relates to a computer readable non-transitory medium on which computer instructions are stored which, when executed by a computer, cause the computer to perform the method 500.

Another aspect of the invention is related to a computer program product comprising program code for performing the method 500 or the functionalities described above, when executed on a computer or a processor. The method 500 may be implemented as program code that may be stored on a non-transitory computer medium. The computer program product may implement the techniques described above with respect to FIGS. 2 to 4.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multipath device for processing multipath data traffic, the multipath device comprising:
   a multipath network access interface for receiving multipath data traffic; and
   a host processor configured to process a plurality of multi-connectivity network protocols;
   wherein a specific multi-connectivity network protocol of the plurality of multi-connectivity network protocols is configured to utilize protocol-specific resources of the multipath device for processing a portion of the multipath data traffic that is related to the specific multi-connectivity network protocol;
   wherein the specific multi-connectivity network protocol is configured to share the protocol-specific resources with other multi-connectivity network protocols which are configured to process portions of the multipath data traffic that are related to the other multi-connectivity network protocols by distributing payload data transport onto multiple sub-flows of a multipath connection;
   wherein the host processor comprises a Multipath Central Information Exchange (MCIE) unit configured to exchange information between at least two multi-connectivity network protocols of the plurality of multi-connectivity network protocols, wherein the at least two multi-connectivity network protocols are configured to register and/or deregister at the MCIE unit for information exchange;
   wherein the MCIE unit is further configured to:
      register a new multi-connectivity network protocol at the MCIE based on the new multi-connectivity network protocol being realized or started on the host processor; and
      deregister a multi-connectivity network protocol registered at the MCIE based on the multi-connectivity network protocol registered at the MCIE being terminated, and inform all other registered multi-connectivity network protocols of the deregistered multi-connectivity network protocol to increase resource quotas of the other registered multi-connectivity network protocols.

2. The multipath device of claim 1, wherein the host processor is configured to exchange information between multi-connectivity network protocols of the plurality of multi-connectivity network protocols for scheduling concurrent usage of the protocol-specific resources.

3. The multipath device of claim 2, wherein the exchanged information comprises at least one of the following:
   current or planned capacity demand,
   current latency and/or capacity estimation,
   type of service,
   prioritization, or
   planned and/or active scheduling.

4. The multipath device of claim 1, wherein the specific multi-connectivity network protocol is configured to process the portion of the multipath data traffic that is related to the specific multi-connectivity network protocol based on information received from the other multi-connectivity network protocols.

5. The multipath device of claim 1, wherein the host processor is configured to process a common congestion control for at least two multi-connectivity network protocols of the plurality of multi-connectivity network protocols based on information exchanged between the at least two multi-connectivity network protocols.

6. The multipath device of claim 1, wherein the host processor is configured to maintain a joint path management for at least two multi-connectivity network protocols of the plurality of multi-connectivity network protocols based on information exchanged between the at least two multi-connectivity network protocols.

7. The multipath device of claim 1, wherein the host processor is configured to link a selected number of multi-connectivity network protocols of the plurality of multi-connectivity network protocols to each other in order to send, receive and/or request information from each other.

8. The multipath device of claim 7, wherein the host processor is configured to form a full mesh information exchange or at least a partial mesh information exchange for linking the selected number of multi-connectivity network protocols to each other.

9. The multipath device of claim 1, wherein the MCIE unit is configured to hook into at least one multi-connectivity network protocol of the plurality of multi-connectivity network protocols to take over processing tasks and/or receive data from the at least one multi-connectivity network protocol in cases in which the at least one multi-connectivity network protocol is not able to register and/or deregister at the MCIE unit.

10. The multipath device of claim 9, wherein the at least two multi-connectivity network protocols are configured to provide their capabilities and interests to the MCIE unit when registering at the MCIE unit.

11. The multipath device of claim 1, wherein the MCIE unit is configured to limit the information exchange to certain types of multi-connectivity network protocols and/or limit the information exchange in time.

12. The multipath device of claim 1, wherein the MCIE unit is configured to control the information exchange based on external information input.

13. The multipath device of claim 1, wherein the host processor is configured to exchange a first portion of information between the at least two multi-connectivity network protocols via the MCIE unit and a second portion of information between the at least two multi-connectivity network protocols bypassing the MCIE unit.

14. The multipath device of claim 1, wherein the MCIE unit is further configured to provide standardized interfaces through which each of the at least two multi-connectivity network protocols communicates with the MCIE.

15. A method for processing multipath data traffic, the method comprising:
   receiving multipath data traffic via a multipath network access interface;
   processing, by a host processor, a plurality of multi-connectivity network protocols;
   utilizing, by a specific multi-connectivity network protocol of the plurality of multi-connectivity network protocols, protocol-specific resources for processing a portion of the multipath data traffic that is related to the specific multi-connectivity network protocol;

sharing, by the specific multi-connectivity network protocol, the protocol-specific resources with other multi-connectivity network protocols which are configured to process portions of the multipath data traffic that are related to the other multi-connectivity network protocols by distributing payload data transport onto multiple sub-flows of a multipath connection; and exchanging, by a Multipath Central Information Exchange (MCIE) unit of the host processor, information between at least two multi-connectivity network protocols of the plurality of multi-connectivity protocols, wherein the at least two multi-connectivity network protocols are configured to register and/or deregister at the MCIE unit for information exchange;

wherein the method further comprises:
  registering, by the MCIE unit, a new multi-connectivity network protocol at the MCIE based on the new multi-connectivity network protocol being realized or started on the host processor; and
  deregistering, by the MCIE unit, a multi-connectivity network protocol registered at the MCIE based on the multi-connectivity network protocol registered at the MCIE being terminated, and informing all other registered multi-connectivity network protocols of the deregistered multi-connectivity network protocol to increase resource quotas of the other registered multi-connectivity network protocols.

16. One or more non-transitory computer-readable mediums having processor-executable instructions stored thereon for processing multipath data traffic, wherein the processor-executable instructions, when executed, facilitate performance of the following:
  receiving multipath data traffic via a multipath network access interface;
  processing, by a host processor, a plurality of multi-connectivity network protocols;
  utilizing, by a specific multi-connectivity network protocol of the plurality of multi-connectivity network protocols, protocol-specific resources for processing a portion of the multipath data traffic that is related to the specific multi-connectivity network protocol;
  sharing, by the specific multi-connectivity network protocol, the protocol-specific resources with other multi-connectivity network protocols which are configured to process portions of the multipath data traffic that are related to the other multi-connectivity network protocols by distributing payload data transport onto multiple sub-flows of a multipath connection; and
  exchanging, by a Multipath Central Information Exchange (MCIE) unit of the host processor, information between at least two multi-connectivity network protocols of the plurality of multi-connectivity protocols, wherein the at least two multi-connectivity network protocols are configured to register and/or deregister at the MCIE unit for information exchange;
wherein the processor-executable instructions, when executed, further facilitate performance of the following:
  registering, by the MCIE unit, a new multi-connectivity network protocol at the MCIE based on the new multi-connectivity network protocol being realized or started on the host processor; and
  deregistering, by the MCIE unit, a multi-connectivity network protocol registered at the MCIE based on the multi-connectivity network protocol registered at the MCIE being terminated, and informing all other registered multi-connectivity network protocols of the deregistered multi-connectivity network protocol to increase resource quotas of the other registered multi-connectivity network protocols.

* * * * *